US 8,478,623 B2

(12) United States Patent
Friedlander et al.

(10) Patent No.: US 8,478,623 B2
(45) Date of Patent: *Jul. 2, 2013

(54) AUTOMATED DERIVATION, DESIGN AND EXECUTION OF INDUSTRY-SPECIFIC INFORMATION ENVIRONMENT

(75) Inventors: Robert R. Friedlander, Southbury, CT (US); Thomas L. Hanks, Winnetka, IL (US); Richard Hennessy, Austin, TX (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/541,238

(22) Filed: Jul. 3, 2012

(65) Prior Publication Data
US 2012/0278122 A1 Nov. 1, 2012

Related U.S. Application Data

(63) Continuation of application No. 12/609,642, filed on Oct. 30, 2009, now Pat. No. 8,285,576.

(51) Int. Cl.
*G06Q 10/00* (2012.01)
(52) U.S. Cl.
USPC .......... 705/7.12; 705/1.1; 705/7.25; 705/7.39
(58) Field of Classification Search
USPC ................................. 705/1.1, 300–301, 348
See application file for complete search history.

(56) References Cited

U.S. PATENT DOCUMENTS

| | | | |
|---|---|---|---|
| 5,887,154 A | 3/1999 | Iwasa et al. | |
| 7,076,474 B2 | 7/2006 | Jin et al. | |
| 7,376,579 B2 | 5/2008 | Hack et al. | |
| 7,548,872 B2 | 6/2009 | Keay et al. | |
| 7,580,911 B2 | 8/2009 | Sun et al. | |
| 7,584,160 B2 | 9/2009 | Friedlander et al. | |
| 2001/0053991 A1 | 12/2001 | Bonabeau | |
| 2003/0033182 A1 | 2/2003 | Stok et al. | |
| 2006/0129440 A1 | 6/2006 | Frauenhoffer et al. | |
| 2007/0038501 A1* | 2/2007 | Lee et al. | 705/10 |
| 2007/0100673 A1 | 5/2007 | Konakalla | |
| 2007/0129981 A1* | 6/2007 | Jang et al. | 705/8 |
| 2010/0022306 A1* | 1/2010 | Campion | 463/42 |
| 2011/0106516 A1 | 5/2011 | Friedlander et al. | |

OTHER PUBLICATIONS

U.S. Appl. No. 12/609,642—Non-Final Office Action Mailed Dec. 6, 2011.

* cited by examiner

*Primary Examiner* — Candice D Wilson
(74) *Attorney, Agent, or Firm* — John R. Pivnichny; Law Office of Jim Boice

(57) ABSTRACT

A computer-implemented method, system, and/or computer program product creates a physical information environment for a specific industry type. A candidate industry type, which has specific information environment requirements, is selected to describe a customer's operations. A set of information environment components that is specific to the candidate industry type is selected. Inherent constraints, for the set of information environment components, are identified. A processor recursively optimizes the set of information environment components to create a set of optimized information environment components that meet the inherent constraints and key performance indicators (KPIs) of the candidate industry type. A hierarchy of KPIs for the candidate industry type is defined. The processor predicts access patterns to the optimized information environment components based on the hierarchy of KPIs. A physical information environment that comprises the set of optimized information environment components is then constructed and deployed.

20 Claims, 5 Drawing Sheets

AUTOMATED DERIVATION, DESIGN AND EXECUTION OF INDUSTRY-SPECIFIC INFORMATION ENVIRONMENT

INDUSTRY-SPECIFIC INFORMATION ENVIRONMENT

The present application is a continuation of U.S. patent application Ser. No. 12/609,642, filed on Oct. 30, 2009, and titled, "Automated Derivation, Design and Execution of Industry-Specific Information Environment," which is incorporated herein by reference.

BACKGROUND

The present disclosure relates to the field of computers, and specifically to computer information environments. Still more particularly, the present disclosure relates to creating an information environment that is optimized for a particular industry type.

SUMMARY

A computer-implemented method, system, and/or computer program product creates a physical information environment for a specific industry type. A candidate industry type, which has specific information environment requirements, is selected to describe a customer's operations. A set of information environment components that is specific to the candidate industry type is selected. Inherent constraints, for the set of information environment components, are identified. A processor recursively optimizes the set of information environment components to create a set of optimized information environment components that meet the inherent constraints and key performance indicators (KPIs) of the candidate industry type. A hierarchy of KPIs for the candidate industry type is defined. The processor predicts access patterns to the optimized information environment components based on the hierarchy of KPIs. A physical information environment that comprises the set of optimized information environment components is then constructed and deployed.

DETAILED DESCRIPTION

Figure 1:
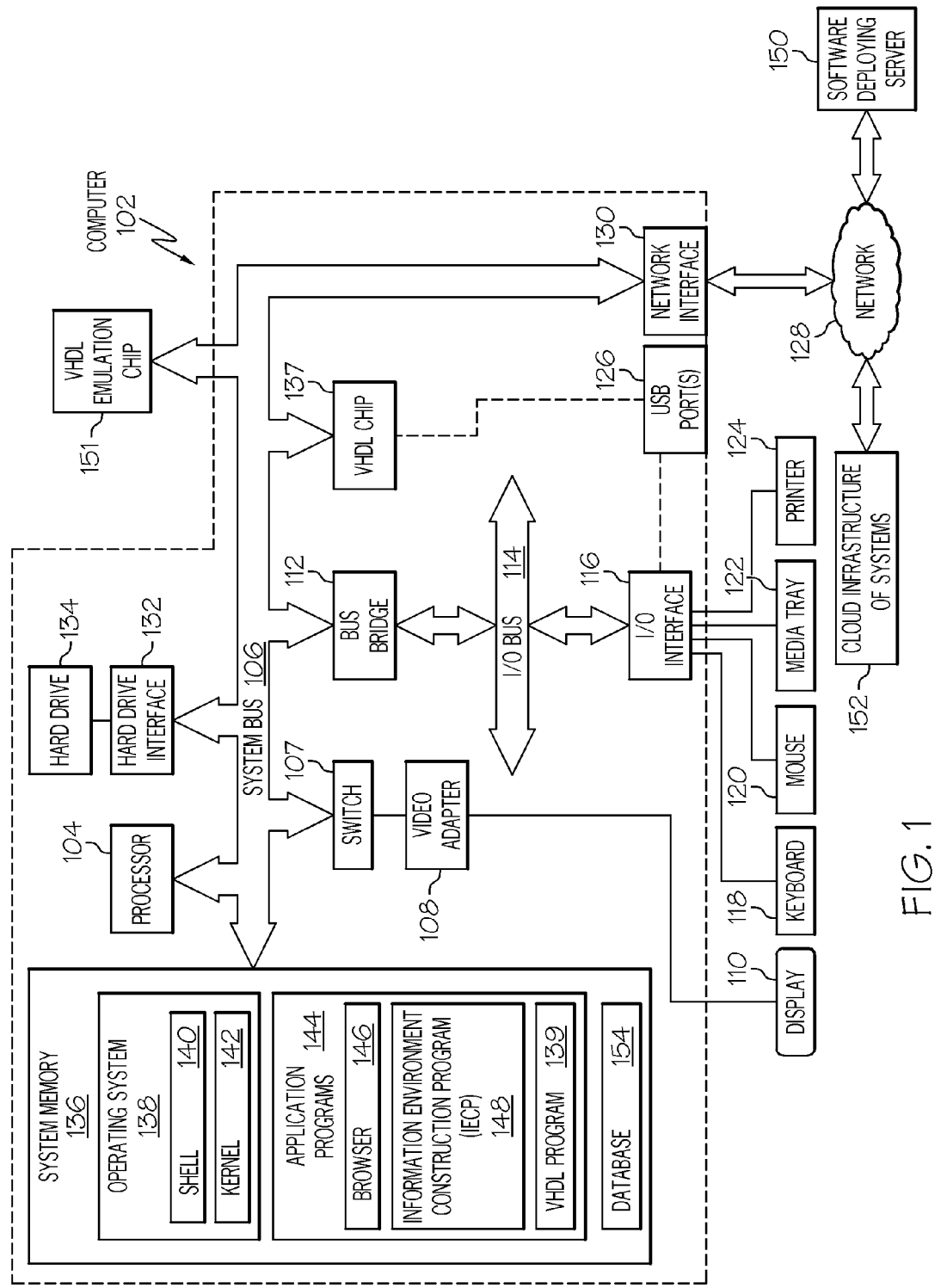
FIG. 1 depicts an exemplary computer in which all or some elements of the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150, as well as computing and/or storage devices found in a cloud infrastructure of systems 152, including but not limited to those systems depicted in FIG. 4.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., information environment construction program IECP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include an information environment construction program (IECP) 148. IECP 148 includes code for implementing the processes described below, including those described in FIGS. 2-5. In one embodiment, computer 102 is able to download IECP 148 from software deploying server 150, including in an on-demand basis. Note further that, in one embodiment of the present invention, software deploying server 150 performs all of the functions associated with the present invention (including execution of IECP 148), thus freeing computer 102 from having to use its own internal computing resources to execute IECP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from IECP 148 causes VHDL program 139 to configure VHDL chip 137, which may be an FPGA, ASIC, etc.

In another embodiment of the present invention, execution of instructions from IECP 148 results in a utilization of VHDL program 139 to program a VHDL emulation chip 151. VHDL emulation chip 151 may incorporate a similar architecture as described above for VHDL chip 137. Once IECP 148 and VHDL program 139 program VHDL emulation chip 151, VHDL emulation chip 151 performs, as hardware, some or all functions described by one or more executions of some or all of the instructions found in IECP 148. That is, the VHDL emulation chip 151 is a hardware emulation of some or all of the software instructions found in IECP 148. In one embodiment, VHDL emulation chip 151 is a programmable read only memory (PROM) that, once burned in accordance with instructions from IECP 148 and VHDL program 139, is permanently transformed into a new circuitry that performs the functions needed to perform the process described below in FIGS. 2-5.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Presented herein is a method, system and computer program product for automating the derivation, design and execution of industry-specific information environments. Examples of such information environments include, but are not limited to:

1) a data warehouse—a large collection of data stores, including assembled data stores. In one embodiment, a star schema is used, in which data components are associated with a central "star" key set to create a constellation of data in a network cloud. Other topologies that may be used include, but are not limited to, topologies that utilize components such as a rules engine, an integrated admin/configuration, a change management/archive/quality/discovery engine, etc.;

2) a data mart—a smaller version of a data warehouse;

3) an operational data store—a database designed to integrate data from multiple sources in order to simplify analysis and reporting. Integration includes cleaning, resolving redundancy and checking against business rules for integrity. In one embodiment, the operational data store is designed to contain low level atomic (indivisible) data that is captured in real time. In another embodiment, the operational data store captures larger divisible volumes of data on a scheduled periodic non-real time basis;

4) a staging area—a system that interfaces between a legacy system and an analytics system, usually a data warehouse and sometimes an operational data store. The staging area handles operations such as extract, transform and load (ETL) operations. Other functions performed in the staging area include, but are not limited to, extracting data from legacy systems, cleaning up (reformatting, etc.) such data, transforming legacy system keys into data warehouse keys, transforming different types of codes (e.g., for different data entry fields) into a data warehouse standard, loading the various data warehouse tables in a particular sequence through a bulk loader provided with the data warehouse database, etc;

5) spreadsheets—small collection of data found in a computer application that simulates a paper worksheet by displaying multiple cells that together make up a grid consisting of rows and columns, where each cell contains data or a formula for data;

6) binary large object (BLOB)—a collection of binary data stored as a single entity in a database management system. Because of their size, BLOBs are often used for video images, audio or other multimedia objects;

7) arrays and nested arrays—any data structure consisting of a collection of elements; and/or 8) markup structures—e.g., extensible markup language (XML), health level 7 (HL7) structure that are created using languages designed to transport and store data using markup coding.

Figure 2:
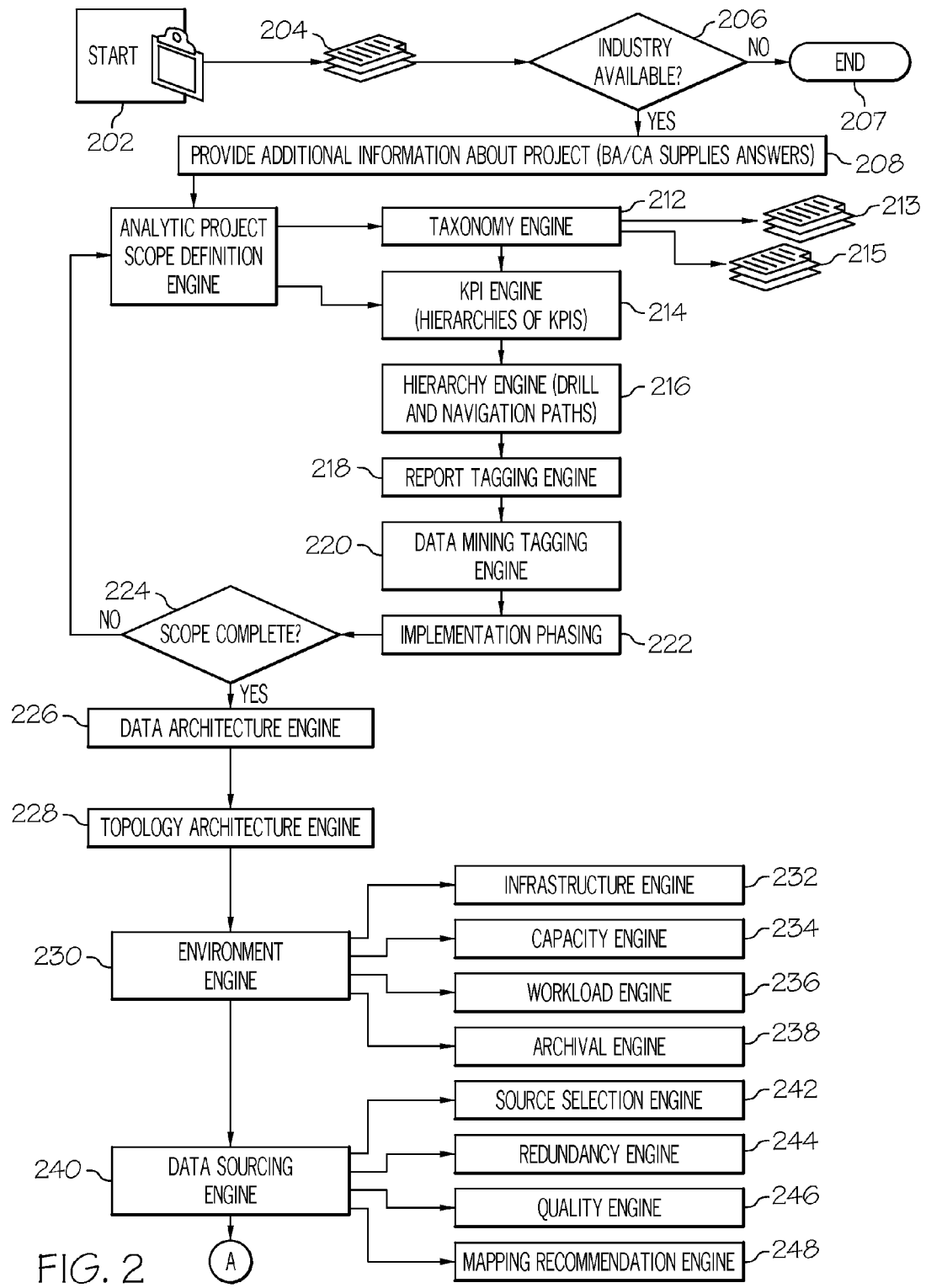
FIGS. 2-3 illustrate exemplary steps taken to generate a physical information environment from a simulated information environment for a specific industry type.
Figure 3:
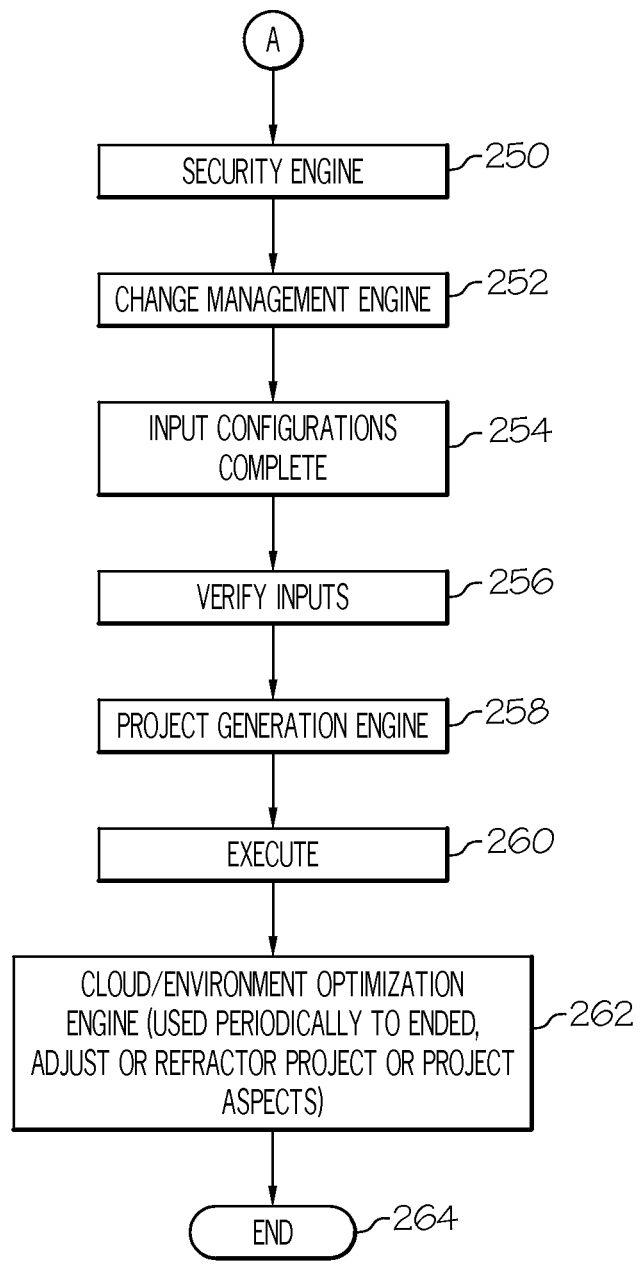

With reference now to FIG. 2-3, a flow-chart of exemplary steps taken to deploy an information environment for a specific industry type is presented. After initiator block 202, an industry type that most closely matches that of a customer is chosen (block 204). This selection may be made manually by the customer or a consultant knowing the operations of the customer, or a software program can be used to take descriptive metadata from various operations within an enterprise, and then compare that descriptive metadata with metadata that describes the candidate industry type. Assuming that such a candidate industry type is available (query block 206), additional information about a particular project that will be using the finally created information environment is obtained (block 208). This information, which may be in the form of a job type descriptor, a job length descriptor, a job budget descriptor, or any other descriptor that will be useful in matching the project to a particularly architected information environment, is then loaded into an analytic project scope definition engine 210. Analytic project scope definition engine 210 is software logic that determines if a project definition already exists for a project described by the information provided in block 208. If so, then a taxonomy engine 212 determines if an existing taxonomy (describing the project, customer, product, etc.) exists. If so, then a (customizable) modeling taxonomy is retrieved from a taxonomy library 213. If not, then taxonomy definitions are imported from a glossary 215 for assembly into the requisite taxonomy. Alternatively, the taxonomy definitions may be manually defined.

A key performance indicator (KPI) engine 214 then creates KPIs for the project, and a hierarchy engine 216 assigns a hierarchy to KPIs for the project and/or customer. A KPI is an indicator that can be measured to determine if a key (e.g., mission critical) activity for the particular industry type is being met. KPIs may be set for a project, customer, enterprise, contract, group, etc. These KPIs may be set by a service level agreement (SLA) or any other document/agreement regarding what a final project/product must achieve. However, some requisite parameters may be more important than others. Thus, KPIs may be ranked in a hierarchy, such that higher-ranked KPIs are in fact essential, while lower ranked KPIs are not, and thus the final information environment meeting the needs of these lower ranked KPIs is less important. A report tagging engine 218 then generates tags used to tag operations in a project, in order to evaluate how well that project meets various KPIs. These tags are then used by a data mining tagging engine 220, which tags and examines the proposed project. Furthermore, tagging combinations of dimensional KPIs to designated aggregation points, levels, and groupings enables automated report creation, optimized indexation and storage need determinations. Such tagging also supports ingestion of existing report libraries, SQL, and workloads logs in order to optimize and generate a recommended report suite. Thus, the tagging of KPIs optimizes the efficiency of anticipated access patterns by allowing the factoring of ingested KPI feeds to determine likely access patterns, volume of access, etc. in order to optimize and recommend structures and associated indexes, aggregation tables, etc.

In one embodiment, data mining tagging is a separate activity. Nonetheless, the goal is the same as for report tagging, which can leverage existing mining algorithms with associated workload characteristics to optimize recommended storage, cpu/memory allocations, workflows, required data normalizations, etc. within the system environment or clouds.

Block 222 describes implementation phasing. Operations within block 222 comprise establishing how the project phasing is defined in terms of content/business scope by phase, which may be a single phase or multiple phases over a number of years. This feature impacts the optimization process as different scenarios are simulated. For example, a project with multiple development phases would be biased toward structures that are easily extensible, while a single phase project would have no need for later extensions.

As described in query block 224, once the scope of the project is fully defined and tagged (the project's function, length, mission, etc.), a data architecture engine 226 is initiated to define an optimal architecture for the information environment that will be supporting the project or program project phases. Data architecture engine 226 is used to determine the optimal data architecture model and to let the system optimize the physical model at each layer based on the preferences indicated by layer. A topology architecture engine 228 then devises the optimal topology for an information environment to be carved out of a cloud of resources, as described and depicted below in FIG. 4.

An environment engine 230 then controls an infrastructure engine 232, a capacity engine 234, a workload engine 236, and an archival engine 238 to further define the cloud from which the information environment/environment is carved. The infrastructure engine 232 has knowledge (e.g., through a local database entry) of available infrastructure, and gathers the details of determinants that allow it to optimize the physical deployment model automatically based on input constraints. Thus, infrastructure engine 232 knows about the CPUs available to each class of server and the storage, memory, database, and bandwidth capabilities of each server, including san, tape backup, etc. The capacity engine 234 captures details on a scale/capacity model for the environment that is used to carve out the environment and continually optimizes these details over time. The capacity engine 234 also defines SLA requirements across all components, discovers and reconciles any SLA conflicts by calculating necessary resource additions that will meet SLA requirements, and defines an implementation model of development, testing, quality assurance and products of the project that will be using the information environment. The workload engine 236 captures anticipated workloads that span the project's length for each project per time period, in order to predict future workload requirements and to make appropriate adjustments (e.g., load balancing, model extension optimizations, etc.). The archival engine 238 is used to archive all information stored in the overall environment as defined by engines 226, 228, and 230. Note that in one embodiment, archival engine 238 archives requirements that are manually assigned or are based on industry requirements, either of which dictates retention requirements and service level agreements (SLAs) by responses to requests—regulatory or otherwise. Thus, archival engine 238 is able to optimize storage of archives by responding to both anticipated and unanticipated access requests, which drive storage to near-line disc, tape or off-line devices depending on the retention requirements. Archival engine 238 balances the costs of different storage options with risks or likelihood of fines, penalties or loss of data.

A data sourcing engine 240 manages a source selection engine 242, a redundancy engine 244, a quality engine 246, and a mapping recommendation engine 248. The source selection engine 242 selects various candidate data sources that best match the needs of the project for the specific industry; this can also be manually captured. The redundancy engine 244 then ensures that data sources from the various candidate data sources do not overlap or are inconsequential. That is, if a first data source has 90% of the data needed for the project, a second data source has 30% of the data needed for the project, and all or most of the data in the second data source is also found in the first data source, then the second data source will be rejected as inconsequential or redundant. Various sliding scales can be set by redundancy engine 244 to determine when a particular database is deemed a poor fit.

The quality engine 246 examines the source, age, reliability, security, etc. of a database, in order to determine if it can be trusted for use on the project. If the project definition (performed above in block 204-220) determines that a project is very important, then the quality of the database will be deemed more important that a project that has less importance assigned to it. The mapping recommendation engine 248 leverages the outputs of rules for sources, redundancy, and quality, which are set by engines 242, 244, and 246 to devise optimal mappings from source structures to target structures which span all the layers of optimized data architecture coming from 226.

A security engine 250 defines which user group, individual, etc. are authorized to access the information environment when completed. This process is accomplished by: 1) interfacing with existing security infrastructure: a lightweight directory protocol (LDAP) structure, an active directory, etc.; 2) defining security models across all topology components; and 3) developing groups with associated privileges or leveraging default groups, and assigning users to these groups, based on information about the user available through existing security assignments. Alternatively, such security can be manually assigned and subsequently rolled-out and implemented in all topology components relevant to that user or user class.

A change management engine 252 then creates policies and rules for converting and managing all aspects of code management, leading major and minor releases of functionality tied to project phasing together with necessary fixes that will be utilized to create and maintain the new information environment. Once all input configurations for the operations described in blocks 202-252 are complete (query block 254), they are verified (query block 256) for accuracy. Once all inputs are verified as accurate, a project generation engine 258 begins the actual process of creating a simulated information environment to be used with a particular project for a particular industry type. The physical environment for the information environment is defined, using a topology recommendation generated in the steps above. An infrastructure cloud from which this topology may be carved is identified, operating systems and other software are installed and configured into the identified hardware on the cloud, rules are set for the system, project and information environment to control how they interact, data models for various data layers generated, data source connectivity, extraction, transformation, and loading (ETL) processes are generated for both initial as well as incremental loading of data, report formats are created, mining algorithms and associated environments are generated, alert profiles are generated, and metadata describing the project and the information environment are generated. Archival polices and routines, as well as change data management and security policies, routines, and modules are also generated. Note that a simulated execution of the process described herein may be run numerous times in a recursive manner, in order to arrive at an optimal recommendation as well as secondary and tertiary options. These multiple options are then presented to a user, administrator, or software logic, who/which can decide which implementation approach should be utilized.

Figure 4:
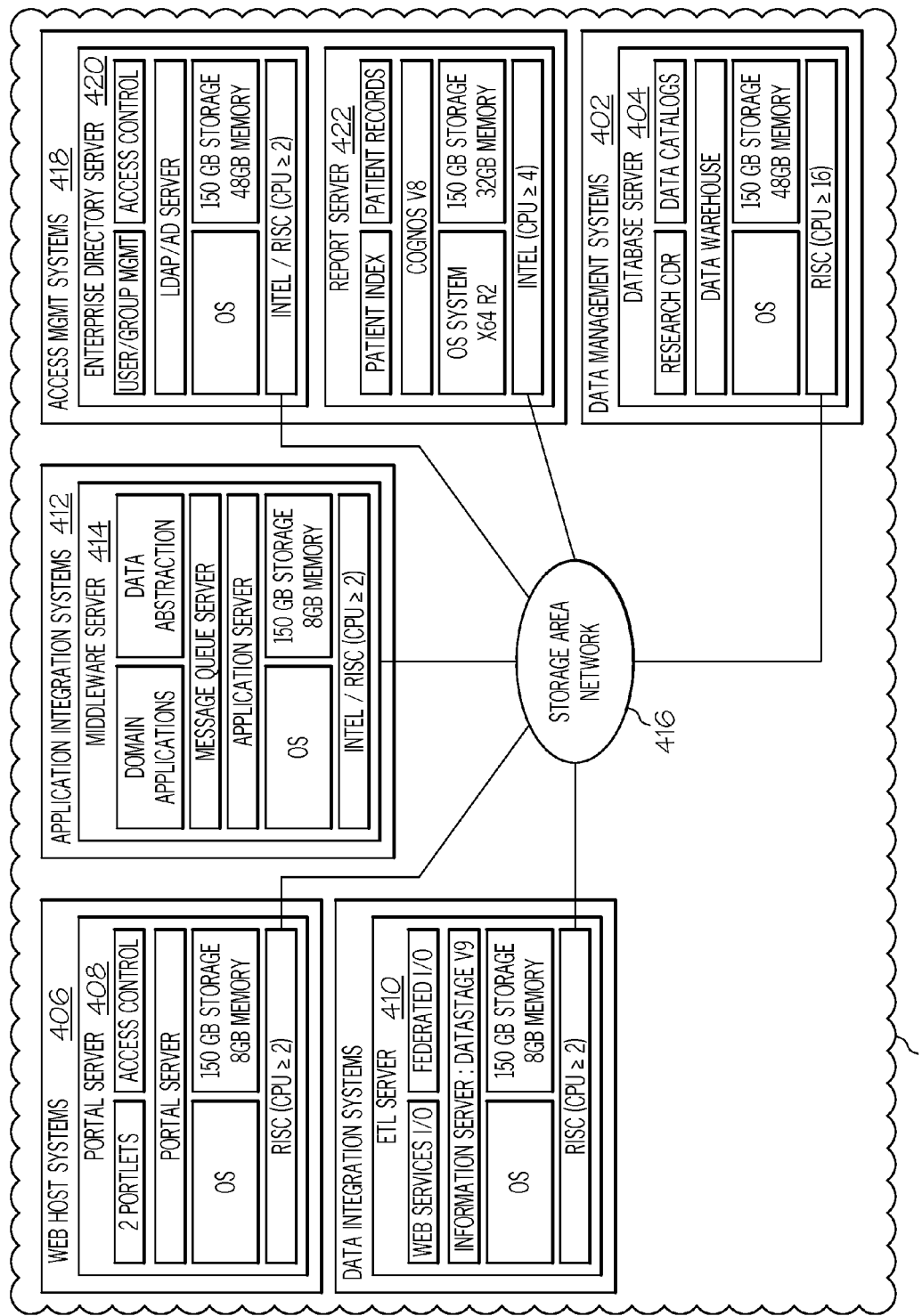
FIG. 4 depicts an exemplary cloud structure from which the physical information environment can be carved.

Once a decision is made to implement the simulated system into physical hardware (query block 260), the system is executed (block 262) on the cloud shown in FIG. 4. The information environment is continually optimized thereafter, in accordance with changes to the project, changes to the resources on the cloud, changes to KPIs, and changes in the efficiency potential of the system. The process ends at terminator block 264.

Figure 5:
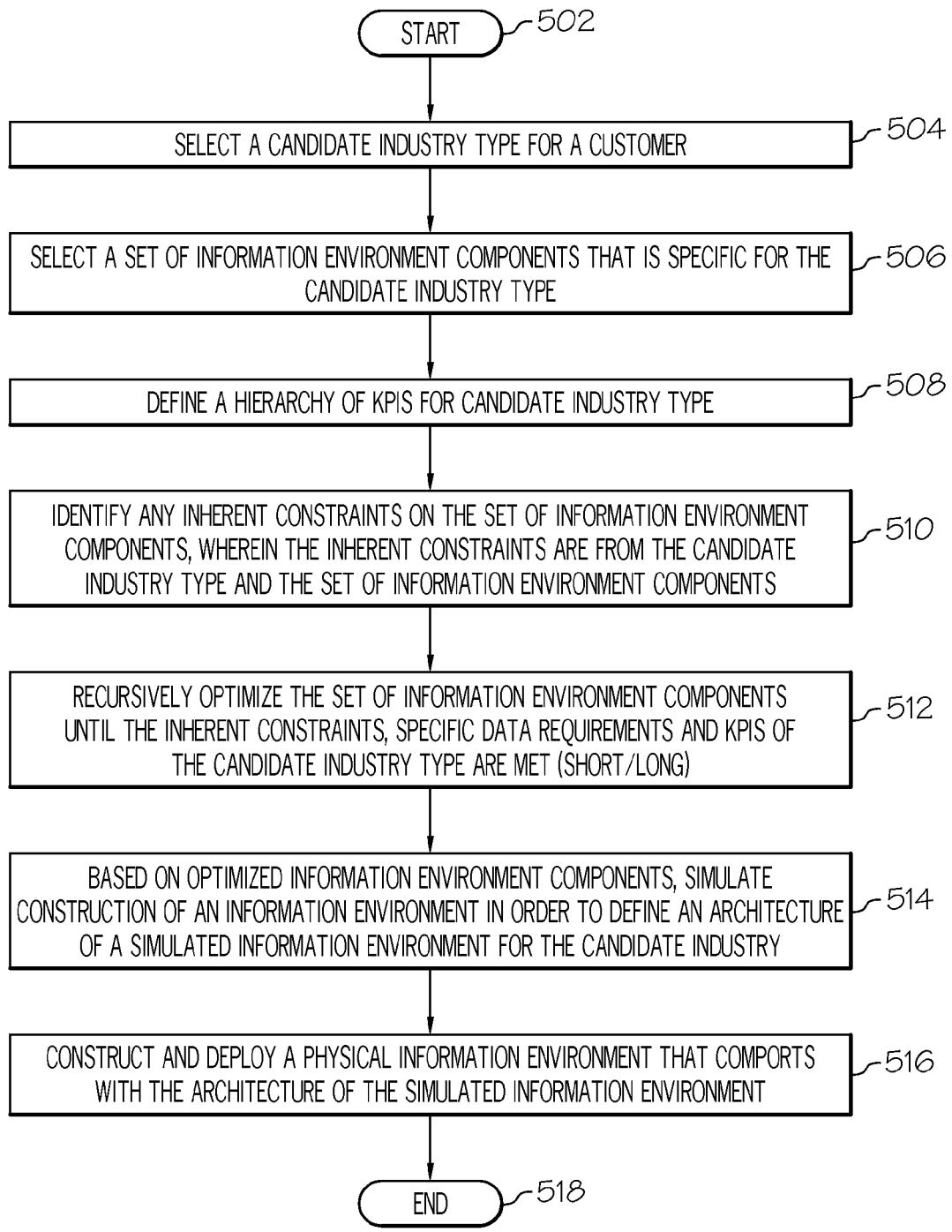
FIG. 5 is a high-level flow-chart of exemplary steps taken to generate a physical information environment from a simulated information environment for a specific industry type.

With reference now to FIG. 5, a high level flow-chart of exemplary steps taken to deploy an industry-specific information environment that is non-brittle (i.e., does not "break" since each component has been carefully selected for a particular industry type) is presented. After initiator block 502, a candidate industry type is selected to describe a customer's operations (block 504). A set of information environment components, which is modeled and simulated in software and is specific for the candidate industry type, is selected (block 506). As depicted in block 508, in one embodiment a hierarchy of key performance indicators (KPIs) of the candidate industry type is defined. A KPI is an indicator that can be measured to determine if a key (e.g., mission critical) activity for the particular industry type is being met. These KPIs are then ranked hierarchically, such that more important KPIs have greater authority to demand certain constraints be met, than less important KPIs.

As described in block 510, inherent constraints, from the candidate industry type and the set of information environment components, are identified. In one embodiment, the inherent constraints from the candidate industry type comprise a turnaround speed requirement that defines how quickly a request for data must be returned for that candidate industry type. In another embodiment, the inherent constraints from the set of information environment component comprise hardware requirements that are the minimum hardware requirements needed to supply data from the physical information environment.

As described in block 512, the set of information environment components are then recursively optimized in order to comply with the inherent constraints and to meet the specific information environment requirements. Furthermore, the set of information environment components can be recursively optimized in order to meet the KPIs of the candidate industry type according to the KPI's hierarchy. That is, a KPI with a low hierarchy ranking may not be required to have its constraints (e.g., how quickly data is provided to meet that KPI, etc) met, while a KPI with a high hierarchy ranking would be required to have its constraints met. In one embodiment, the information environment components are further refined by defining a length of a project to be executed using the physical information environment, such that a longer project requires a greater level of conformity to the inherent restraints than a shorter project.

As depicted in block 514, based on optimized information environment components, construction of an information environment is simulated in order to define an architecture of a simulated information environment for the candidate industry type. A physical information environment that comports with the architecture of the simulated information environment is then constructed and deployed (block 516), and the process ends (terminator block 518).

Note that in one embodiment the physical information environment is carved out of a cloud infrastructure of systems 400, such as those depicted above in FIG. 4. This cloud infrastructure of systems 400 comprises: a database management system 402 for controlling an interface to a database server 404, wherein the database server 404 stores data used by the physical information environment carved out of the cloud infrastructure of systems 400; a web host system 406 for managing a portal server 408 and an extraction, transformation, and loading (ETL) server 410, wherein the portal server 408 and the ETL server 410 provide portal access to extract, transform and load data from physical database servers, including database server 404, an application integration system 412 that comprises a middleware server 414 for serving middleware to reach the physical database servers from a storage area network 416, and an access management system 418 for servicing an enterprise directory server 420 for creating a directory of the physical database servers, and for servicing a report server 422 for creating reports that describe the performance of the physical database server 404.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer-implemented method of creating a physical information environment for a specific industry type, the computer-implemented method comprising: selecting a candidate industry type to describe a customer's operations, wherein the candidate industry type has specific information environment requirements;
   selecting a set of information environment components that is specific to the candidate industry type;
   identifying inherent constraints on the set of information environment components, wherein the inherent constraints are for the candidate industry type and the set of information environment components;
   a processor recursively optimizing the set of information environment components to create a set of optimized information environment components that meets the inherent constraints and key performance indicators (KPIs) of the candidate industry type;
   defining a hierarchy of KPIs for the candidate industry type;
   the processor predicting access patterns to the optimized information environment components based on the hierarchy of KPIs of the candidate industry type, wherein higher ranked KPIs take precedence over relatively lower ranked KPIs in determining access priorities for accessing components in the set of optimized information environment components;
   and constructing and deploying a physical information environment that comprises the set of optimized information environment components.

2. The computer-implemented method of claim 1, wherein the physical information environment is carved out of a cloud infrastructure of systems.

3. The computer-implemented method of claim 2, wherein the cloud infrastructure of systems comprises:
   a database management system for controlling an interface to a database server, wherein the database server stores data used by the physical information environment;
   a web host system for managing a portal server and an extraction, transformation, and loading (ETL) server, wherein the portal server and the ETL server provide portal access to extract, transform and load data from physical database servers;
   an application integration system for serving middleware to reach the physical database servers from a storage area network;
   and an access management system for:
   creating a directory of the physical database servers, and creating reports of physical database server performance.

4. The computer-implemented method of claim 1, wherein the inherent constraints for the candidate industry type comprise a turnaround speed requirement, wherein the turnaround speed requirement defines how quickly a request for data must be returned for that candidate industry type.

5. The computer-implemented method of claim 1, wherein the inherent constraints for the set of information environment components comprise hardware requirements, wherein the hardware requirements are optimal hardware requirements needed to supply data from the physical information environment.

6. The computer-implemented method of claim 1, further comprising: simulating the physical information environment to create a simulated information environment;
   and refining the simulated information environment by defining a length of a project to be executed using the physical information environment, wherein a longer project requires a greater level of conformity to the inherent constraints than a shorter project.

7. The computer-implemented method of claim 1, further comprising: determining, by a quality engine, a quality level for a first database and a second database within the set of information environment components, wherein the quality level is determined according to a source, an age, and a security level of data within each database, and wherein the first database is determined to have a higher quality than the second database;
   determining an importance level for a first project and a second project, wherein the importance level is determined by different project definitions for the first project and the second project, and wherein the first project is determined to be more important than the second project;
   and assigning the first database for use by the first project and the second database for use by the second project.

8. The computer-implemented method of claim 1, further comprising: identifying a first database and a second database within the set of information environment components;
   and in response to determining, by a redundancy engine, that the second database contains a subset of data that is fully contained within the first database, removing the second database from the optimized set of information environment components.

9. A computer system comprising:
   a central processing unit (CPU), a computer readable memory, and a computer readable storage media;
   first program instructions to select a candidate industry type to describe a customer's operations, wherein the candidate industry type has specific information environment requirements;
   second program instructions to select a set of information environment components that is specific to the candidate industry type;
   third program instructions to identify inherent constraints on the set of information environment components, wherein the inherent constraints are for the candidate industry type and the set of information environment components;
   fourth program instructions to recursively optimize the set of information environment components to create a set of optimized information environment components that meets the inherent constraints and key performance indicators (KPIs) of the candidate industry type;
   fifth program instructions to define a hierarchy of KPIs for the candidate industry type;
   sixth program instructions to predict access patterns to the optimized information environment components based on the hierarchy of KPIs of the candidate industry type, wherein higher ranked KPIs take precedence over relatively lower ranked KPIs in determining access priorities for accessing components in the set of optimized information environment components, and seventh program instructions to construct and deploy a physical information environment that comprises the set of optimized information environment components; and
   wherein the first, second, third, fourth, fifth, sixth, and seventh program instructions are stored on the computer readable storage media for execution by the CPU via the computer readable memory.

10. The computer system of claim 9, wherein the physical information environment is carved out of a cloud infrastructure of systems.

11. The computer system of claim 10, wherein the cloud infrastructure of systems comprises:

a database management system for controlling an interface to a database server, wherein the database server stores data used by the physical information environment; a web host system for managing a portal server and an extraction, transformation, and loading (ETL) server, wherein the portal server and the ETL server provide portal access to extract, transform and load data from physical database servers;

an application integration system for serving middleware to reach the physical database servers from a storage area network;

and an access management system for:

creating a directory of the physical database servers, and creating reports of physical database server performance.

12. The computer system of claim 9, wherein the inherent constraints for the candidate industry type comprise a turnaround speed requirement, wherein the turnaround speed requirement defines how quickly a request for data must be returned for that candidate industry type.

13. The computer system of claim 9, wherein the inherent constraints for the set of information environment components comprise hardware requirements, wherein the hardware requirements are optimal hardware requirements needed to supply data from the physical information environment.

14. A computer program product for creating a physical information environment for a specific industry type, the computer program product comprising:

a non-transitory computer readable storage media;

first program instructions to select a candidate industry type to describe a customer's operations, wherein the candidate industry type has specific information environment requirements;

second program instructions to select a set of information environment components that is specific to the candidate industry type;

third program instructions to identify inherent constraints on the set of information environment components, wherein the inherent constraints are for the candidate industry type and the set of information environment components;

fourth program instructions to recursively optimize the set of information environment components to create a set of optimized information environment components that meets the inherent constraints and key performance indicators (KPIs) of the candidate industry type;

fifth program instructions to define a hierarchy of KPIs for the candidate industry type;

sixth program instructions to predict access patterns to the optimized information environment components based on the hierarchy of KPIs of the candidate industry type, wherein higher ranked KPIs take precedence over relatively lower ranked KPIs in determining access priorities for accessing components in the set of optimized information environment components, and seventh program instructions to construct and deploy a physical information environment that comprises the set of optimized information environment components; and wherein the first, second, third, fourth, fifth, sixth, and seventh program instructions are stored on the non-transitory computer readable storage media.

15. The computer program product of claim 14, wherein the physical information environment is carved out of a cloud infrastructure of systems.

16. The computer program product of claim 15, wherein the cloud infrastructure of systems comprises:

a database management system for controlling an interface to a database server, wherein the database server stores data used by the physical information environment; a web host system for managing a portal server and an extraction, transformation, and loading (ETL) server, wherein the portal server and the ETL server provide portal access to extract, transform and load data from physical database servers;

an application integration system for serving middleware to reach the physical database servers from a storage area network;

and an access management system for:

creating a directory of the physical database servers, and creating reports of physical database server performance.

17. The computer program product of claim 14, wherein the inherent constraints for the candidate industry type comprise a turnaround speed requirement, wherein the turnaround speed requirement defines how quickly a request for data must be returned for that candidate industry type.

18. The computer program product of claim 14, wherein the inherent constraints for the set of information environment components comprise hardware requirements, wherein the hardware requirements are optimal hardware requirements needed to supply data from the physical information environment.

19. The computer program product of claim 14, further comprising:

eighth program instructions to simulate the physical information environment to create a simulated information environment;

and ninth program instructions to refine the simulated information environment by defining a length of a project to be executed using the physical information environment, wherein a longer project requires a greater level of conformity to the inherent constraints than a shorter project, and wherein the eighth and ninth program instructions are stored on the non-transitory computer readable storage media.

20. The computer program product of claim 14, further comprising: eighth program instructions to determine a quality level for a first database and a second database, wherein the quality level is determined according to a source, an age, and a security level of data within each database, and wherein the first database is determined to have a higher quality than the second database;

ninth program instructions to determine an importance level for a first project and a second project within the set of information environment components, wherein the importance level is determined by different project definitions for the first project and the second project, and wherein the first project is determined to be more important than the second project;

and tenth program instructions to assign the first database for use by the first project and the second database for use by the second project, and wherein the eighth, ninth, and tenth program instructions are stored on the non-transitory computer readable storage media.

* * * * *